United States Patent [19]

Walsh et al.

[11] Patent Number: 5,797,124
[45] Date of Patent: Aug. 18, 1998

[54] VOICE-CONTROLLED VOICE MAIL HAVING RANDOM-ORDER MESSAGE RETRIEVAL BASED ON PLAYED SPOKEN IDENTIFIER LIST

[75] Inventors: James K. Walsh; Marc A. Gardner, both of Plano, Tex.

[73] Assignee: InterVoice Limited Partnership, Reno, Nev.

[21] Appl. No.: 656,519

[22] Filed: May 30, 1996

[51] Int. Cl.[6] .............................. G10L 9/06; H04M 1/64
[52] U.S. Cl. .................. 704/275; 704/270; 379/67; 379/89
[58] Field of Search .................. 704/270, 275; 379/67, 89

[56] References Cited

U.S. PATENT DOCUMENTS

| | | | |
|---|---|---|---|
| 4,757,525 | 7/1988 | Matthews et al. | 379/89 |
| 5,029,200 | 7/1991 | Haas et al. | 379/89 |
| 5,283,818 | 2/1994 | Klausner et al. | 379/67 |
| 5,335,276 | 8/1994 | Thompson et al. | 380/21 |
| 5,390,236 | 2/1995 | Klausner et al. | 379/67 |
| 5,465,401 | 11/1995 | Thompson | 455/558 |
| 5,511,111 | 4/1996 | Serbetcioglu et al. | 379/67 |
| 5,524,140 | 6/1996 | Klausner et al. | 379/67 |
| 5,647,002 | 7/1997 | Brunson | 380/49 |

*Primary Examiner*—David R. Hudspeth
*Assistant Examiner*—Talivaldis Ivars Smits
*Attorney, Agent, or Firm*—Fulbright & Jaworski L.L.P.

[57] ABSTRACT

A system and method for voice controlled message retrieval. Each message stored in a voice mail system has an associated header and return address. The system generates and stores a speech recognition template from each unique header. When a subscriber wishes to retrieve a message, the subscriber speaks the header. The subscriber's speech is then compared with the speech recognition templates stored in the system. If a matching template is found, the system plays the message associated with the header from which the template was generated. Additionally, the subscriber can tag certain callers and cause the system to apply special treatment to messages from tagged callers. Moreover, the subscriber can reply to a caller calling from outside the system.

31 Claims, 2 Drawing Sheets

VOICE-CONTROLLED VOICE MAIL HAVING RANDOM-ORDER MESSAGE RETRIEVAL BASED ON PLAYED SPOKEN IDENTIFIER LIST

TECHNICAL FIELD OF THE INVENTION

This invention relates to data retrieval and more particular to a system and method for retrieval of temporarily stored data using voice commands and even more particularly to such systems and methods for retrieving voice mail by simply saying the name of the person who left the message.

BACKGROUND OF THE INVENTION

It has now become almost common place for callers to leave voice mail messages when a called party does not answer the telephone. In such systems the called party at some future time calls into a database to retrieve the message. To accomplish this task, the called party must enter a series of commands from the keypad and listen to various voice prompts in order to hear (or skip over) his or her messages. Typically, the party desiring to retrieve the messages does not know the content of the message and only in some situations (for example, when the party leaving the message happens to be associated with the same system as the called party) does the retrieving party even know the identity of the party leaving the message.

In addition, the party retrieving the messages often cannot deliver a response to the caller unless the caller has an account on the same voice mail system as the retrieving party. Moreover, there is no way for the called party to identify certain callers and provide those callers with special treatment.

Thus, it would be advantageous if the retrieving party could retrieve data, such as messages, in random order and without entering a series of digits or responding to a series of inquiries. Preferably, such retrieval would be voice activated.

It would be a further advantage if the retrieving party could deliver a response to a caller located outside of the retrieving party's voice mail system.

It would be yet another advantage if the retrieving party could identify particular callers and provide special handling for subsequent calls from those particular callers.

SUMMARY OF THE INVENTION

These and other advantages are achieved by a system and method in which a caller who is about to input data for subsequent retrieval by another person is asked to identify himself or herself. The caller then provides his or her name, a nickname, a code name, etc. In addition, the caller is asked to leave a return address indicating where the caller can be reached. The system then records the spoken identity and the associated return address in a database.

The called party, in a voice-mail system, then queries the system to determine if messages are waiting and receives from the system a spoken list of identities. These identities are the identities which were previously stored in the database. The called party then speaks (repeats) one of the identities from the list and the system then retrieves the data associated with that spoken identity.

When the called party begins to retrieve his or her messages, for example, the called party will hear the message: "You have five messages. Your messages are from, Billy, Tom, Jim, David, and Mom S. Which message do you desire to hear?" The speaker will respond with one of the names from the list, such as, "mom S." The message in the database associated with "mom S" will be delivered to the called party.

After listening to the message, the called party has several options including replying to the message or tagging it. To reply, the called party can simply say "reply." The voice mail system will then record the reply and attempt to deliver the reply to the caller via the associated return address. To tag a message, the called party can simply say "tag." The voice mail system will then prompt the called party for how to treat the called party. For example, the voice mail system can be configured to page the called party whenever the tagged caller calls. The voice mail system recognizes the tagged caller by utilizing the previously stored identity.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
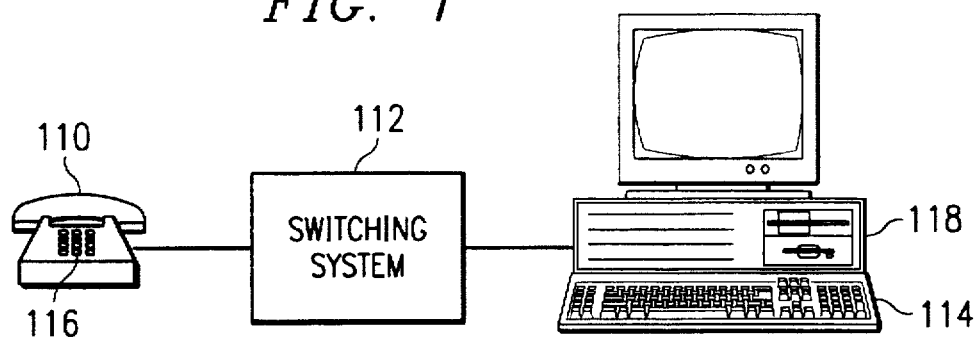
FIG. 1 illustrates a voice mail system adapted to execute the present invention.

FIG. 1 illustrates a high-level overview of a voice mail system and related components adapted to execute the present invention. Shown are a telephone 110, a switching system 112 such as a central office or private branch exchange, and a voice mail system 114. Telephone 110 is a standard telephone having a DTMF keypad 116 by which commands and numbers can be entered. It should be recognized that other devices, such a computer modem, can be substituted for telephone 110 and used with respect to the present invention as described below.

Switching system 112 functions as a stand alone call processor. Calls placed from telephone 110 may eventually be directed by switching system 112 to voice mail system 114. Voice mail system 114 answers the call and processes it as described below. Voice mail system 114 stores information necessary to perform its functions in database 118. Database 118 can be any general purpose storage device, such as a hard drive.

Throughout this specification, reference is made to a "caller" and a "subscriber." Unless otherwise indicated, the caller is the person leaving a message and the subscriber is the person for whom the message is left.

When the caller connects with the subscriber's voice mail system 114, the system prompts the caller to input a name tag, or header. Usually, the header is the caller's name, although it could also be a nickname or other means of identification.

Next, system 114 generates a speech recognition template from the header. A speech recognition template is a data construct well known in the art of speech recognition. Essentially, a template is a digital representation of a spoken word or phrase stored in a format designed to ease comparison of the template with other spoken words or phrases.

If the caller's call originates outside system 114, the caller is preferably prompted to enter information indicating the caller's return address. Usually, this information is the caller's phone number and can be entered via the telephone keypad 116 or spoken. Alternatively, the return address can be determined via automatic number identification (ANI). This return address information is associated with the caller's speech recognition template and saved in the system's database 118.

Finally, the caller is prompted to leave a voice message for the subscriber. The message is saved in voice mail system 114 along with its associated header and return address.

System 114 saves incoming messages in an in box. Multiple messages from the same caller, as indicated by the caller's return address, can be grouped together. In addition, the subscriber's saved messages are placed in a second box.

Figure 2:
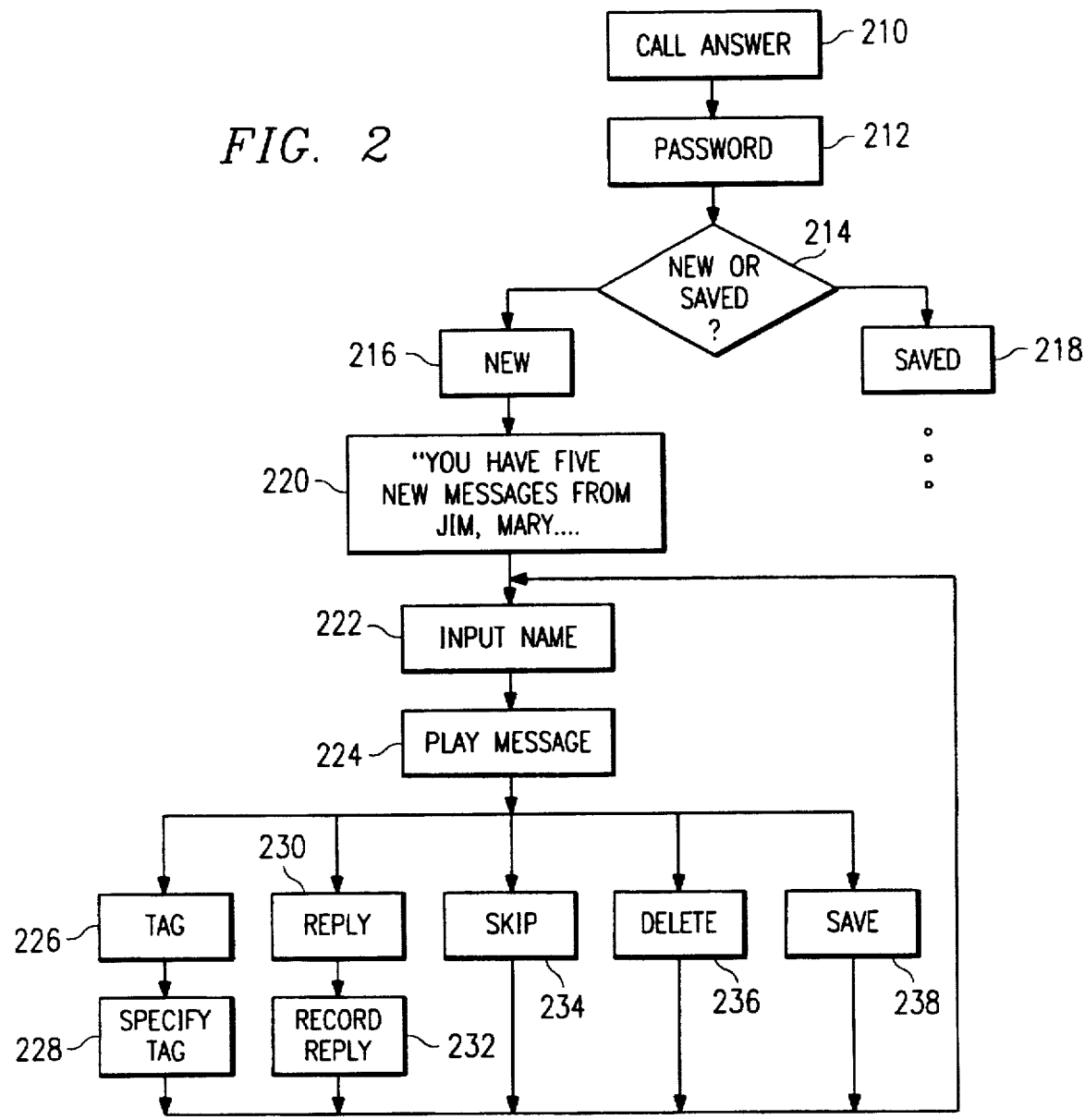
FIG. 2 is a flow chart illustrating a hierarchical menu system according to the present invention.

FIG. 2 is a flow diagram illustrating a preferred embodiment of a menu structure used by a subscriber to access messages in voice mail system 114. Note that system 114 is preferably voice activated. Accordingly, each time system 114 receives an input from the subscriber, system 114 compares the input to the voice templates for each possible command and to the voice templates for each voice message within system 114. Then, system 114 preferably plays a prompt to the subscriber indicating that the command was received and understood.

Assume that the subscriber calls in to retrieve messages. At step 210, voice mail system 114 answers the subscriber's call. At this point, the subscriber identifies him or herself to system 114 by, for example, speaking a password (step 212). Next, at step 214, system 114 asks the subscriber whether it should play new or saved messages. If the subscriber says "new," then system 114 moves to step 216 to process the new messages as described below. If the subscriber says "saved," then system 114 moves to step 218 and processes saved messages in substantially the same manner as described below with respect to new messages. Alternatively, system 114 could be configured to move directly from step 212 to step 216, thereby saving the subscriber the step of specifying new or saved messages.

At step 220, system 114 announces the number of new messages and plays the headers of current messages in rapid succession. After the headers are played, system 114 waits for the subscriber to speak a particular header (step 222). After system 114 receives a spoken header from the subscriber, system 114 plays the message (step 224) having the header that mostly matches that spoken by the subscriber. If the subscriber remains silent, system 114 plays the messages in the order in which they were received.

While the message is playing, the subscriber can "barge in" with a new command. In other words, the subscriber can speak a command and voice mail system 114 will immediately stop playing the message and process the command. Otherwise, system 114 plays the whole message and then waits for a command from the subscriber.

Possible subscriber commands include: tag, reply, skip, delete, and save. The "tag" command (step 226) tells system 114 to treat any new messages from the same caller in a special manner. When a tag command is received, system 114 marks the speech recognition template associated with the tagged message and saves the template in database 118. At step 228, system 114 queries the subscriber for a type of tag. Possible tags could include: "page," which causes system 114 to page the subscriber if the caller calls again; "call me," which causes system 114 to call the subscriber if the caller calls again; and "voice mail," which merely directs the caller to voice mail. Obviously, other types of tags can be developed depending upon the subscriber's needs. Once the type of tag is set, system 114 returns to step 222.

The subscriber can also issue a "reply" command (step 230). In response, system 114 prompts the user to record a reply and schedule delivery (step 232). If the reply is directed to another subscriber within voice mail system 114, then system 114 merely places the reply in that subscriber's in box. Otherwise, system 114 can be configured to deliver the message to the return address left by the caller when the message was recorded. Then, system 114 returns to step 222.

Another possible command the subscriber can issue is "skip." The skip command (step 234) moves system 114 to the next message in the subscriber's queue. Accordingly, system 114 returns to step 222. The skipped message remains in the subscriber's in box.

The "delete" command (step 236) deletes the current message from the subscriber's in box. The "save" command (step 238) saves the current message to a different location within the subscriber's voice mail. In addition, the save command can be made the default command if the subscriber does not speak a command within a predetermined time period after the message is played. After the save or delete command, system 114 returns to step 222.

Of course, system 114 resembles a typical voice mail system in that it may have other commands not represented in the flowchart of FIG. 2. For example, system 114 can have a "forward" command that forwards messages to other subscribers or callers. Similarly, system 114 should have commands for traversing back up the command hierarchy and replaying the new message headers. All of these commands can be implemented in a manner like those discussed above.

Figure 3:
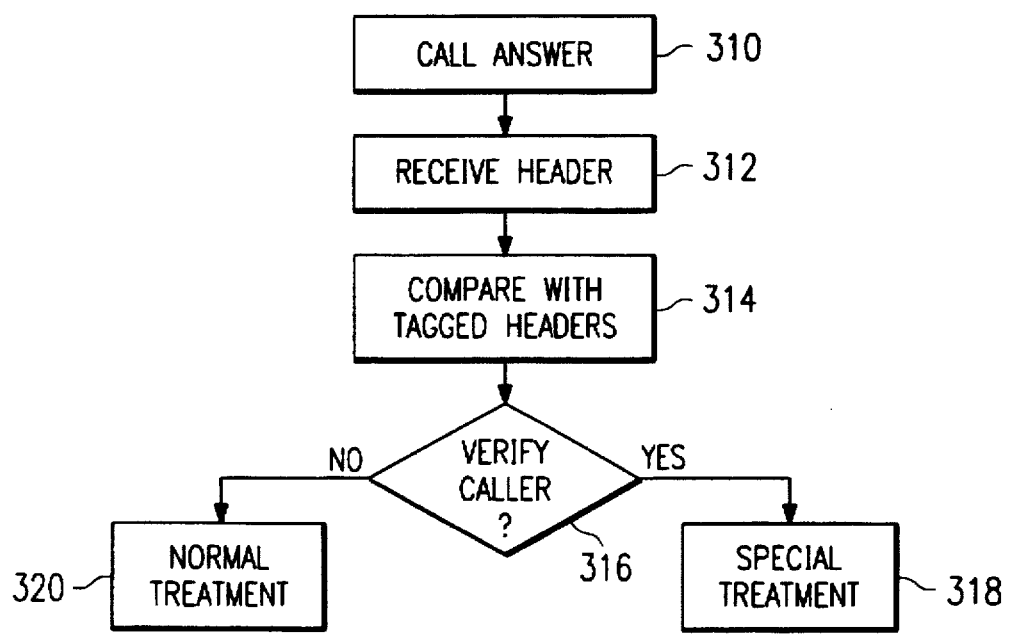
FIG. 3 is a flow chart illustrating the steps performed when a tagged caller calls the voice mail system of FIG. 1.

FIG. 3 is a flow chart illustrating the steps performed when a tagged caller calls voice mail system 114. At step 310, system 114 answers the caller's call. At step 312, system 114 prompts for and receives a header from the caller as discussed above with respect to FIG. 1. Next, at step 314, system 114 compares the newly received header with a list of speech recognition templates marked in response to the tag command as discussed with respect to step 226.

If the caller's header matches a previously tagged header, then system 114 verifies that the caller is in fact the tagged caller (step 316). Step 316 could be performed, for example, by asking the caller "Are you <play matching header>?" If the caller indicates "yes," then system 114 provides the special treatment indicated by the subscriber at step 228 (step 318). Otherwise, system 114 handles the call in the normal manner (step 320).

Although the above system preferably responds to the caller's and subscriber's spoken commands, system 114 can easily be adapted to respond to other forms of input. For example, system 114 can be controlled by DTMF input or by a computer system coupled to voice mail system 114.

In addition, it should be noted that the command hierarchy discussed herein is exemplary in nature. Indeed, a prime advantage of using speech templates as disclosed herein is that the command hierarchy can be greatly flattened. Instead of responding to a series of prompts, the subscriber need only speak a header to retrieve a message.

Although the present invention and its advantages have been described in detail, it should be understood that various changes, substitutions and alterations can be made herein without departing from the spirit and scope of the invention as defined by the appended claims.

What is claimed is:

1. A system for storing messages from callers and for selectively retrieving the messages by a subscriber, comprising:

means for prompting each of said callers to utter a message identifier;

means for associating said message identifiers with a specific message;

means for storing the message identifiers and the associated messages;

means for playing a list of said message identifiers for said subscriber;

means for determining whether an input received from the subscriber matches a stored message identifier; and means for playing the message associated with a matched one of the stored message identifiers.

2. The system of claim 1, further comprising:

means for providing special treatment for subsequent calls to the system from certain callers.

3. The system of claim 2, wherein the means for providing special treatment comprises:

means for notifying the subscriber when certain callers call the system.

4. The system of claim 2, wherein the means for providing special treatment further comprises:

means for prompting a subsequent caller to input a subsequent uttered message identifier;

means for comparing the subsequent message identifier with previously stored message identifiers; and means for verifying that a matched subsequent message identifier identifies the caller.

5. The system of claim 1, further comprising:

means for saving the message identifiers after the associated messages have been deleted.

6. The system of claim 1, further comprising:

means for prompting the subscriber for the input.

7. The system of claim 1, wherein the associating means includes:

means for associating a caller's return address with the message.

8. The system of claim 7, wherein the means for associating a return address includes means for automatically determining a communication location of the caller.

9. The system of claim 7, further comprising:

means for automatically delivering a reply from the subscriber to the caller's return address.

10. The system of claim 7, wherein the caller's return address is remote from the system.

11. The system of claim 1, wherein the associating means comprises means for recognizing a speech pattern of a caller.

12. The system of claim 1, wherein the identity is a name tag.

13. The system of claim 1, further comprising:

means for converting the message identifiers into speech recognition templates.

14. The system of claim 13, wherein the means for determining comprises:

means for comparing the input with the speech recognition templates.

15. The system as set forth in claim 1 wherein said determining means includes:

means for sequentially communicating a list of said message identifiers to said subscriber without communicating the associated message.

16. A method of delivering a message from a caller to a subscriber of a voice mail system, comprising the steps of:

prompting the caller to input a header utterance identifying the caller and to input a message associated therewith;

storing the header utterance;

playing the header utterance to the subscriber upon command of the subscriber;

receiving an input from the subscriber;

comparing the input with the stored header utterance; and if the input matches the stored header utterance, playing the message identified by the header utterance to the subscriber.

17. The method of claim 16, further comprising the step of:

providing special treatment for subsequent calls to the voice mail system based upon recognition of the caller's voice patterns.

18. The method of claim 17, wherein the providing special treatment step comprises the step of:

notifying the subscriber when the caller calls the voice mail system.

19. The method of claim 17, wherein the providing step comprises the steps of:

comparing the header utterance with previously stored header utterances to determine a matched previously stored header utterance; and verifying that said matched previously stored header utterance identifies the caller.

20. The method of claim 16, wherein the presenting step comprises the steps of:

playing a list of header utterances to the subscriber; and prompting the subscriber for the input.

21. The method of claim 16, further comprising the step of:

associating the message with information indicating where the caller can be reached.

22. The method of claim 21, further comprising the step of:

delivering a reply from the subscriber to the caller by automatically using the information indicating where the caller can be reached.

23. The system of claim 21, wherein the caller is remote from the voice mail system.

24. The method of claim 21, wherein the step of associating the message with information uses automatic number identification to determine a communication location of the caller.

25. The method of claim 16, further comprising the step of:

converting the header utterance into a speech recognition template; and wherein the comparing step compares the input with the speech recognition template.

26. A method of replaying one or more messages from one or more callers, comprising the steps of:

playing a list of headers to a subscriber, each header identifying a message left by a caller on a voice mail system;

receiving a voice input from the subscriber;

comparing the voice input against the played list of headers to find a matching header; and playing the message identified by the matching header.

27. The method of claim 26, further comprising the step of:

providing special treatment for subsequent calls from the caller who left the message identified by the matching header.

28. The method of 27, wherein the providing special treatment step comprises the step of:

notifying the subscriber when the caller makes a subsequent call to the system.

29. The method of claim 26, further comprising the step of:

generating a speech recognition template for each header in the list;

wherein the comparing step compares the voice input to the speech recognition templates.

30. A method for processing messages in a voice mail system, said method comprising the steps of:

obtaining a spoken identifier from a message-leaving party;

playing, upon request of said subscriber, a list of all spoken identifiers left by said message-leaving parties.

31. The method as set forth in claim 30 further comprising the steps of:

accepting a subscriber selection of one of said spoken identifiers; and delivering, to said subscriber, a message related to said subscriber-selected spoken identifier.

* * * * *